Aug. 27, 1957 M. SANFORD 2,804,510
TELEPHONE HANDSET SUPPORT
Filed June 14, 1954 2 Sheets-Sheet 1

INVENTOR.
MABLE SANFORD
BY
Boykin, Mohler & Wood
ATTORNEYS

Aug. 27, 1957 M. SANFORD 2,804,510

TELEPHONE HANDSET SUPPORT

Filed June 14, 1954 2 Sheets-Sheet 2

INVENTOR.
MABLE SANFORD
BY Boykin, Mohler & Wood
ATTORNEYS

United States Patent Office 2,804,510

Patented Aug. 27, 1957

2,804,510

TELEPHONE HANDSET SUPPORT

Mable Sanford, San Francisco, Calif.

Application June 14, 1954, Serial No. 436,527

2 Claims. (Cl. 179—157)

This invention relates to a support for a telephone receiver for holding such handset on the body of the user in a position of the handset for use in transmitting messages.

Heretofore various type of holders or supports for handsets have been designed, and for the most part these holders require some uncomfortable and unnatural distortion of the head or shoulders of the user to hold them in position. Also, most of those of which I am aware are intended for support on one shoulder only of the user, with the result that the handset, at best, is precariously held should the person attempt any bodily movements other than are directed toward the specific purpose of holding the handset in position. Furthermore many prior attempts limit the use of the holder to one side only of the head which restricts the use to one ear only.

One of the objects of this invention is the provision of a support for a telephone handset that is comfortable and that holds the handset in proper position for use irrespective of the bodily movements of the user in doing various kinds of work with the hands.

A still further object of the invention is the provision of a telephone handset holder that is quickly and easily engageable with and removable from such handset without injuring the latter, and which holder is adapted to securely and safely hold the handset to the body of a user in the proper position for use of the latter while permitting the user to use his or her hands in doing work without disturbing the position of the handset.

Another object of the invention is the provision of a telephone handset support and holder that is adapted to be quickly adjusted to accommodate persons having different anatomical variations that would normally tend to prevent the use of the holder for more than one person for whom the holder was specifically designed.

With the present holder the head can be turned and moved in any direction without interference with the position of the telephone handset, and the hands of the person can be employed in doing work while such person is using the handset.

Other objects and advantages will appear in the description and in the drawings.

Figures 1, 2:
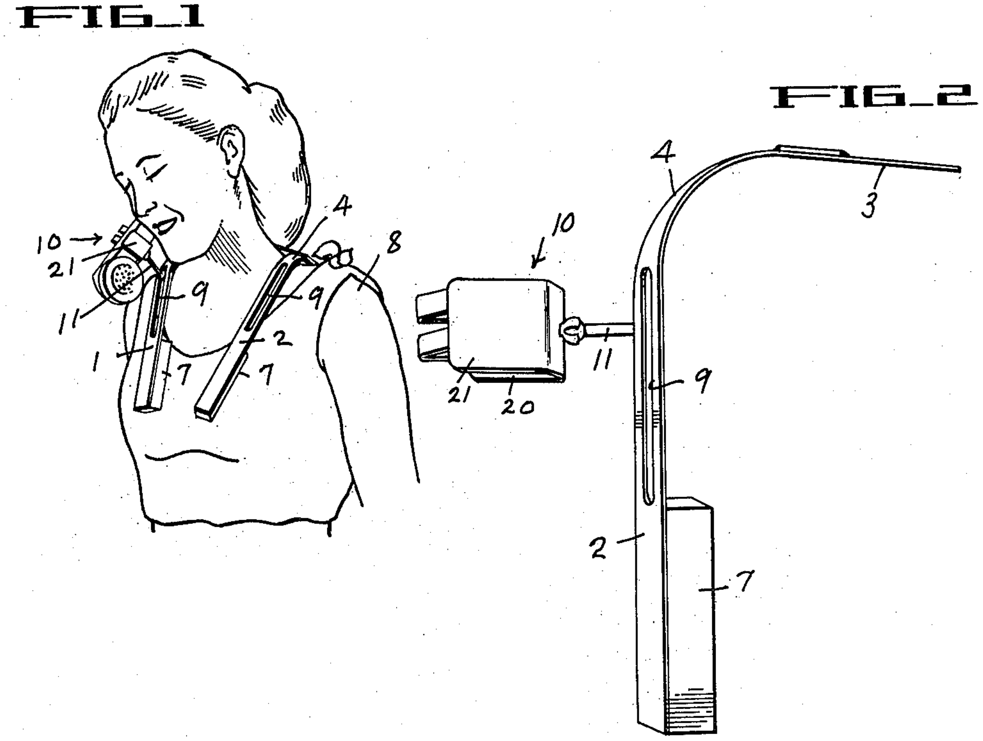
Fig. 1 illustrates one form of the invention in use on a person.
Fig. 2 is an enlarged side or edge view of the support of Fig. 1.
Figure 3:
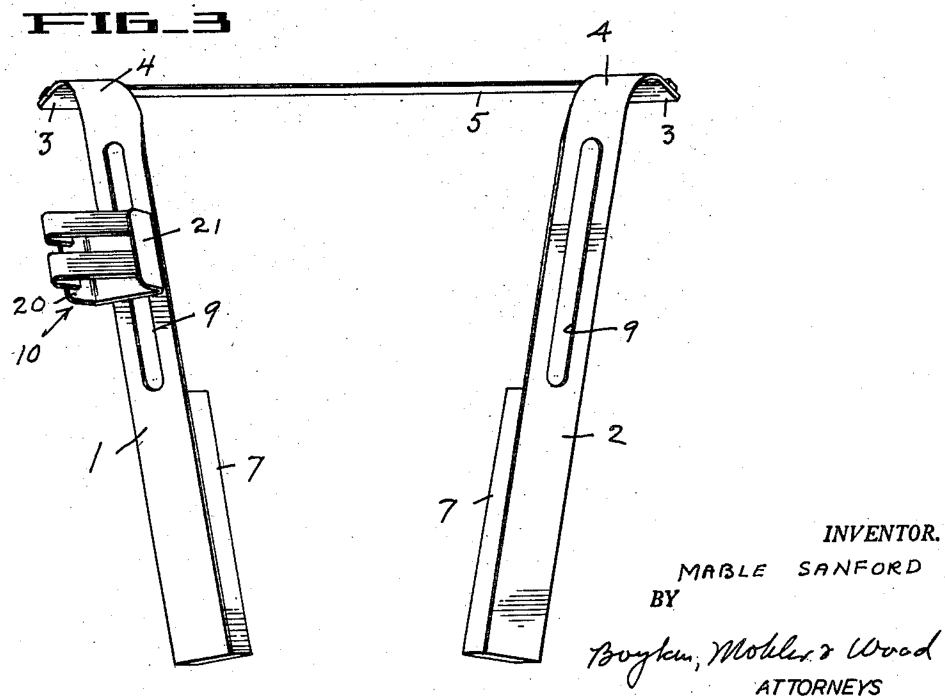
Fig. 3 is a front elevational view of the support of Fig. 1.
Figures 4, 5:
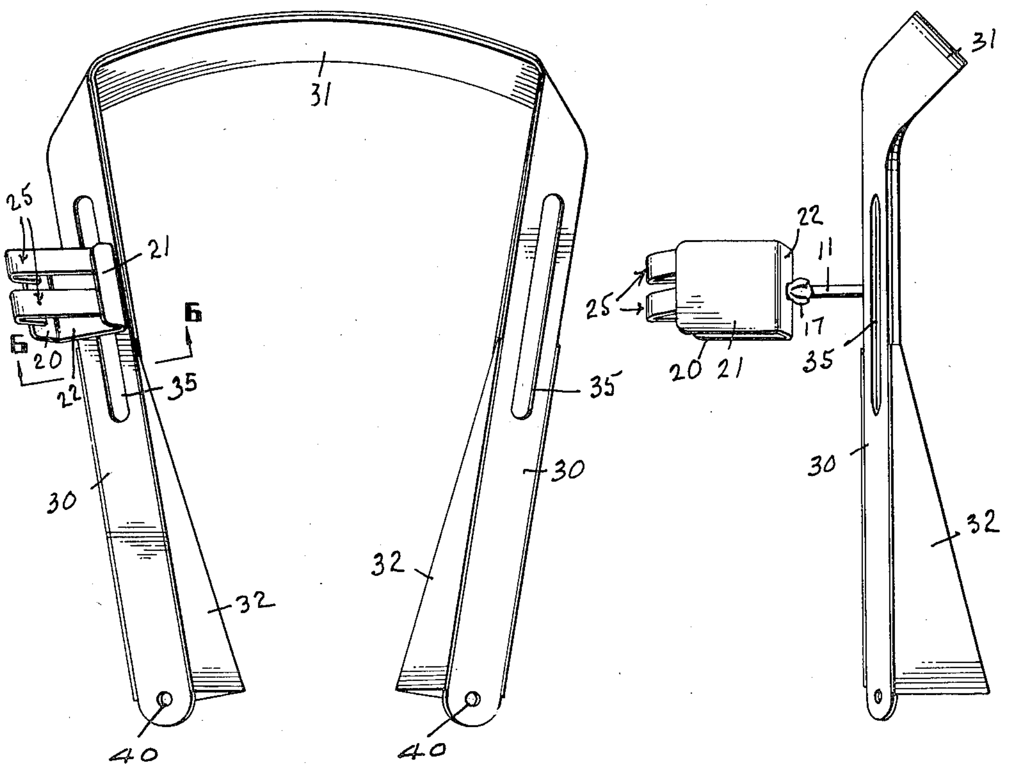
Fig. 4 is a front elevational view of a slightly different form of the invention than is shown in Figs. 1 to 3.
Fig. 5 is a side elevational view of the support of Fig. 4.

In detail, the front view of the support of Figs. 1 to 3 shows a yoke having a pair of upwardly extending arms 1, 2 each of which is curved rearwardly and downwardly at the upper end thereof as at 3.

The curved section 4 of each arm is adapted to engage and to substantially conform to the contour of the shoulders of a person, and the portions 3 are connected by a horizontal flat cross piece 5.

The arms 2 including curved sections 4 and the end portions 3 are preferably strips formed from light weight material, such as metal or plastic, and the concavely curved flat inner sides of sections 4 are adapted to lie flat on the shoulders.

Cushions 7 of soft resilient material, such as, for example, foam rubber, may be secured to the undersides of the free ends of arms 1, 2.

When the yoke as above described is in position on a person 8 (Fig. 1) the connecting cross strip 5 and end portions 3 extend over the back of the person and the arms 1, 2 extend downwardly over the chest with the cushions 7 resting against the chest.

Each of the arms 1, 2 is preferably longitudinally slotted as at 9.

Figures 6, 7, 8:
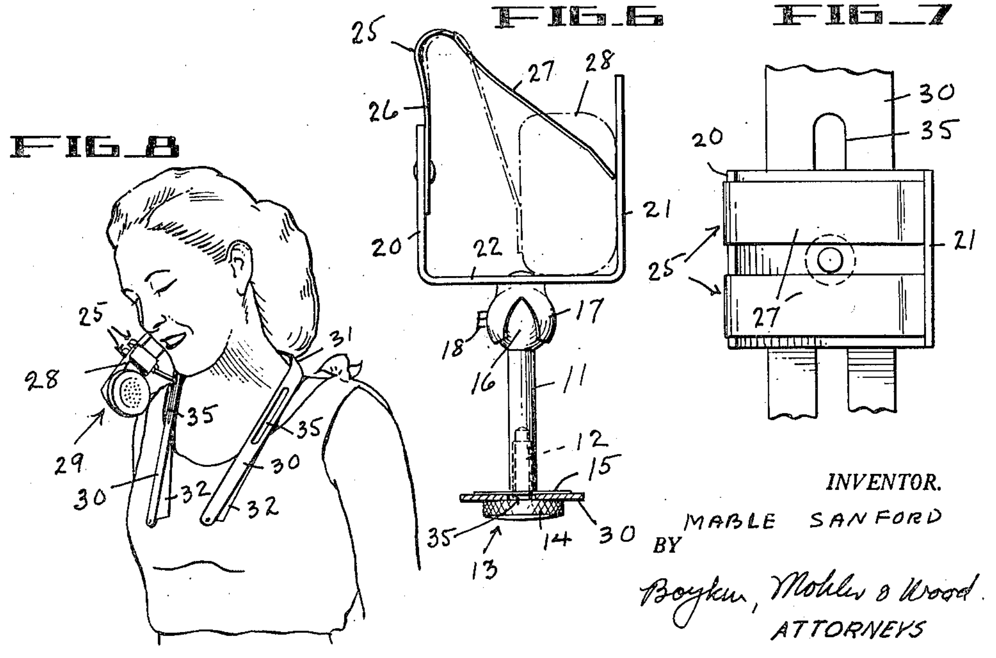
Fig. 6 is an enlarged sectional view of the holder for the telephone handset taken along line 6—6 of Fig. 4.
Fig. 7 is a plan view of the holder of Fig. 6.
Fig. 8 is a perspective view showing the support of Fig. 4 on a person.

The handset holder itself, for Figs. 1 to 3 and 4 to 7 may be the same, hence the numbers used for the handset holder will be the same for all views. This holder is generally designated 10, and comprises a post 11 that is axially hollow at its lower end and threaded to receive the threaded shank 12 of a bolt 13 said bolt having a relatively flat head 14 (Fig. 6).

The said shank 12 is adapted to extend through either slot 8, as desired, and into post 11. A washer 15 may be between the post and the head 14 of the bolt.

Head 14 of the bolt may be knurled to facilitate turning it by hand, and when it is tightened the post will be secured stationary at any desired point along slot 8.

This post may carry a ball 16 at its upper end for fitting in a socket 17 of the handset holder, and a screw 18 may extend through the socket for frictional engagement with the ball to frictionally resist movement of the ball except under a predetermined force, and which force can be adjusted by adjusting screw 18.

The handset holder itself comprises a U-shaped channel section having opposed sides 20, 21 and a base 22. The socket 17 is secured to the underside of said base.

Secured to side 20 is a clip that is in the form of a pair of similar lead springs 25. Each spring 25 has an arm 26 (Fig. 6) secured to side 20 and projecting outwardly of the open side of the channel formed by said sides and base.

At a point spaced outwardly of said channel section the springs 25 are angularly extended back as at 27 to the side 21 and the free ends of the portions 27 substantially engage the inner surface of side 21.

The central bar or handle 28 of the handset (shown in cross sectional outline in dot-dash lines in Fig. 6) is adapted to be slipped in to the open side of the holder between sides 20, 21 forcing the portions 27 of the spring away from side 21 and yieldably holding said handset handle within said holder.

The handset holder opens generally upwardly when the yoke is on a person, hence the weight of the handset itself tends to hold it in the holder, although the springs 25 will prevent any possibility of the handset accidentally falling out of the holder or moving relative thereto.

The holder can be quickly secured to either arm of the yoke as desired so as to support the handset, generally designated 29 (Fig. 8) at either side of the head. The holder can be rotated, tilted to any side, and slid along the arm of the yoke to any desired position. Thus the ear piece and mouth piece of the handset can be positioned in any position most suitable for the user. Since the yoke supports the holder and handset without any help from the head of the user, the head can be moved freely without regard for the handset, and any speech coming over the handset will be clearly heard, although should the hearing be impaired, the user can place his ear close to the handset by a natural movement.

The support shown in Figs. 4 to 8 is in many respects much more economical to make than the one shown in Figs. 1 to 3 inasmuch as it is formed from a single strip of material to the form of a yoke having arms 30 that may extend slightly convergently downwardly. The central section 31 of the strip is bent to be in a plane substantially at right angles to the plane in which arms 30 are disposed, and this section 31 is adapted to extend behind the neck of the person.

Wedgelike cushions 32 are secured to the end portions of arms 30 on their undersides so as to fit against the chest of a person, the thicker ends of said cushions being at the outer ends of said arms.

This yoke is comfortable since the flat sides of the strip from which it is formed extend across the back of the neck, over the shoulders and a distance downwardly over the chest.

Each of the arms 30 is slotted at 35 for the handset holder, the latter having been fully described in connection with the support of Figs. 1 to 3.

The same advantages are present in this holder and support as have been described for Figs. 1 to 3.

The detailed description of the illustrations are not intended to be restrictive to the precise structure so described. It is obvious that different means than the post 11 and bolt 13 may be employed to hold the holder in adjusted position on the yoke. However, the structure as described enables rotation of the holder about the axis of the post as well as movement of the holder along arms 30 as a unit. Other means than the ball and socket joint may also be used, although the said ball and socket joint permits universal movement of the holder.

The foam rubber 7 and 32, respectively, shown in the two forms of the invention hereinabove described not only provides a soft pad but it provides a friction surface that tends to cling to the clothing or to the skin thus preventing the yoke from accidentally shifting under the weight of the telephone handset or the action of the user when using the telephone.

The openings 40 at the lower ends of the arms 30 are for releasably receiving the angularly projecting ends of any suitable relatively rigid link or stiffener (not shown) therein, should the user so desire, although normally such link is not required.

I claim:

1. A support for a telephone handset comprising: a yoke having a pair of spaced arms adapted to extend over the shoulders and chest of a person, a holder for said handset having a handset gripping portion, a post, means connecting said holder to one end of said post for substantially universal movement of said holder relative to said one end, means connecting the other end of said post to said yoke with said holder positioned over one of said arms and supporting said holder for movement relative to said yoke in a direction for movement of said holder generally longitudinally of said one arm.

2. A support for a telephone handset comprising; a yoke having a pair of spaced arms adapted to extend over the shoulders and chest of a person, a holder for said handset having a handset gripping portion, a post, means connecting said holder to one end of said post for substantially universal movement of said holder relative to said one end, means connecting the other end of said post to said yoke with said holder positioned over one of said arms and supporting said holder for movement relative to said yoke in a direction for movement of said holder generally longitudinally of said one arm, said means connecting the other end of said post to said yoke including a releasable locking means for locking said post against movement relative to said yoke.

References Cited in the file of this patent

UNITED STATES PATENTS 2,644,043 Zakos ---------------- June 30, 1953

FOREIGN PATENTS 228,675 Great Britain ---------- Feb. 12, 1925